(12) United States Patent
Gulwani et al.

(10) Patent No.: US 8,316,345 B2
(45) Date of Patent: Nov. 20, 2012

(54) PROGRAM ABSTRACTION BASED ON PROGRAM CONTROL

(75) Inventors: Sumit Gulwani, Redmond, WA (US); Akash Lal, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 1572 days.

(21) Appl. No.: 11/757,198

(22) Filed: Jun. 1, 2007

(65) Prior Publication Data

US 2008/0301655 A1  Dec. 4, 2008

(51) Int. Cl.
*G06F 9/45* (2006.01)

(52) U.S. Cl. ........................................ 717/104
(58) Field of Classification Search .................. 717/104
See application file for complete search history.

(56) References Cited

U.S. PATENT DOCUMENTS

| | | | |
|---|---|---|---|
| 4,616,315 A * | 10/1986 | Logsdon et al. ............. 711/156 |
| 6,381,739 B1 * | 4/2002 | Breternitz et al. ............. 714/37 |
| 6,587,844 B1 * | 7/2003 | Mohri ............................ 706/20 |
| 6,593,940 B1 | 7/2003 | Petersen et al. |
| 6,817,009 B2 | 11/2004 | Flanagan et al. |
| 7,089,534 B2 | 8/2006 | Hartman et al. |
| 7,886,272 B1 * | 2/2011 | Episkopos et al. ............ 717/124 |
| 7,945,898 B1 * | 5/2011 | Episkopos et al. ............ 717/124 |
| 8,037,517 B2 * | 10/2011 | Fulp et al. ........................ 726/11 |
| 2001/0011370 A1 * | 8/2001 | Gunter et al. ..................... 717/4 |
| 2003/0204641 A1 | 10/2003 | Rehof et al. |
| 2005/0086648 A1 | 4/2005 | Andrews et al. |
| 2005/0177775 A1 | 8/2005 | Qadeer et al. |
| 2005/0246682 A1 | 11/2005 | Hines |
| 2006/0130010 A1 | 6/2006 | Rehof et al. |
| 2006/0218534 A1 | 9/2006 | Kahlon et al. |
| 2006/0248515 A1 | 11/2006 | Qadeer et al. |

OTHER PUBLICATIONS

"Race Checking by Context Inference," by Thomas A. Henzinger, Ranjit Jhala and Rupak Majumdar, copyright 2004 ACM 1-58113-807-5/04/0006, PLDI'04, Jun. 9-11, 2004, Washington, DC, EECS Department, UC Berkeley, CS Department, UC Los Angeles, [online] [retrieved on Nov. 8, 2006], pp. 1-13. Retrieved from the Internet: http://delivery.acm.org/10.1145/1000000/996844/p1-henzinger.pdf?key1=996844&key2=5292174611&coll=GUIDE&dl=GUIDE&CFID=7360202&CFTOKEN=43512701.

"Pointer Analysis for Multithreaded Programs," by Radu Rugina and Martin Rinard, copyright 1999 ACM 1-58113-083-X/99/0004, Laboratory for Computer Science, Massachusetts Institute of Technology, Cambridge, Massachusetts, [online] [retrieved on Nov. 28, 2006], pp. 77-90. Retrieved from the Internet: http://delivery.acm.org/10.1145/310000/301645/p77-rugina.pdf?key1=301645&key2=7592174611&coll=GUIDE&dl=GUIDE&CFID=7360219&CFTOKEN=29071727.

"Using Counter Example Guided Abstraction Refinement to Find Complex Bugs," by Per Bjesse and James Kukula, date unknown, Synopsys Inc., [online] [retrieved on Nov. 28, 2006], 6 pgs. Retrieved from the Internet: http://www.cs.chalmers.se/~bjesse/date04.pdf.

\* cited by examiner

*Primary Examiner* — John Chavis
(74) *Attorney, Agent, or Firm* — Workmann Nydegger

(57) ABSTRACT

Embodiments described herein relate to determining an abstraction of a computer program and to the refinement of an abstraction of a computer program. The computer program may be a sequential program or may be a concurrent (parallel) program. A directed graph represents a computer program and may be the cross product of threads within a concurrent program. Nodes within a representation of a program are reduced to a single node to produce an abstraction. An abstraction may be refined by determining constraints that produce a refined abstraction that does not comprise infeasible paths.

17 Claims, 8 Drawing Sheets

PROGRAM ABSTRACTION BASED ON PROGRAM CONTROL

BACKGROUND

Computer programs and software are ubiquitous and are used not just to direct the functionality of conventional computers but also to control and enhance the functionality of a myriad of modern products and appliances. For instance, televisions, household appliances, cellular phones, automobiles, medical devices, and so forth, may incorporate computer programs which direct and enhance their functionality. The theoretical and practical analysis of computer programs is an important aspect of software research, development, modification, enhancement, and maintenance. The ability to analyze computer programs and reason about their execution, from both theoretical and practical perspectives, aids software developers by allowing them to make better and more informed choices during development of software and the modification or enhancement of existing software. Analysis of software is useful for proving correctness of code, for performing optimizations of existing code, for doing performance analysis and so on.

Computers and computer processors are no longer simple single processors executing software in an instruction-by-instruction sequential fashion. The availability of multi-core processors is increasing and the demand for concurrent (or parallel) software to take advantage of multi-processor computers and multi-core processors is also increasing. Computers are increasingly having multiple processors that can concurrently, or in parallel, execute multiple instructions and procedure threads simultaneously. Such concurrent processing (also referred to as "parallelism") can greatly increase both the speed and processing power of computer systems when correctly exploited.

This increasing availability of multi-core processors and multiple processor computers is rapidly increasing the availability of parallelism in computing hardware and is increasing the demand on developers to develop and redesign software to exploit that parallelism. The use of parallelism and concurrency in programming is becoming increasingly more useful, important, and ubiquitous. However, analysis and verification of concurrent software can be extremely difficult, and determining properties for the software and checking their correctness can be problematic for software developers and computer scientists.

For purposes of analysis, it is often efficient and desirable to reduce the complexity of the software using some abstraction, eliminating aspects not necessary for the analysis. For sequential programs, abstracting only data was often a sufficient basis for analysis. For concurrent programs, however, abstraction of data, alone, is not enough. During execution of a concurrent program, there may be multiple threads operating on the same data simultaneously. For the analysis of concurrent programs, it is desirable to abstract program control (as well as, possibly, data).

Because of the greater information necessary in the analysis of concurrent programs, analysis of parallel or concurrent programs is hard—theoretically as well as practically. For sequential programs, intraprocedural analysis using a regular language abstraction may be accomplished in P-time. Interprocedural analysis using a context-free language abstraction for a sequential program may also be accomplished in P-time. However, the intraprocedural analysis using a regular language abstraction in a concurrent program is PSPACE-hard and the interprocedural analysis using context-free language abstraction is theoretically undecidable.

Because of the difficulties encountered in using more common abstraction techniques, better methods are needed for the abstraction and analysis of parallel or concurrent software. When two or more threads of a program may be executing simultaneously, then the possible states for the program may be given by the cross product of all the possible states of one thread with the possible states of the other executing threads. For concurrent programs with a reasonably large number of states within a single thread or large numbers of threads, this number of possible states may be huge. The huge number of program control states possible in concurrent programs makes abstraction of concurrent programs, and their analysis, a difficult problem.

Flow-insensitive pointer analysis for concurrent programs, which analyzes the states of data but ignores the states of the program flow or control, can be efficient but is imprecise. Flow-sensitive analysis, which takes into account the program control states of independently executing threads of a concurrent program, can be precise but is inefficient.

BRIEF SUMMARY

Embodiments described herein relate to determining abstractions for computer programs. For example, embodiments described herein provide for determining abstractions for computer programs by accessing a representation of a computer program which is represented by a directed graph. The abstraction of the computer program may then be determined by reducing one or more nodes within the directed graph to a single node, thereby simplifying the graph representation of the program. Embodiments may be useful for determining abstractions of concurrent programs—those programs which may have multiple threads executing simultaneously. It should be noted, however, that techniques disclosed herein are not limited to concurrent programs and may be employed and be useful for any program, including strictly sequential programs.

Additional embodiments described herein relate to refining an abstraction of a computer program. An abstraction may be refined by choosing a path within an abstraction of a program and determining if that path is an infeasible path. If the path is determined to be infeasible, then a constraint may be generated which, when applied to the abstraction, produces a refined abstraction that does not comprise the infeasible path. As above, the refinement technique may be employed and is useful for refining abstractions of concurrent programs but may also be employed and be useful for refining abstractions for any computer program, including strictly sequential programs.

Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantageous features of embodiments described herein can be obtained, a more particular description of the embodiments summarized above will be rendered by reference to specific embodiments thereof which are illustrated in the appended drawings. Understanding that these drawings depict only example embodiments and are not therefore to be considered to be limiting of the scope of the invention, the example embodiments will be described and explained with additional specificity and detail through the use of the accompanying drawings in which.

DETAILED DESCRIPTION

Embodiments described herein relate to the determination and/or use of abstractions for computer programs.

Figure 1:
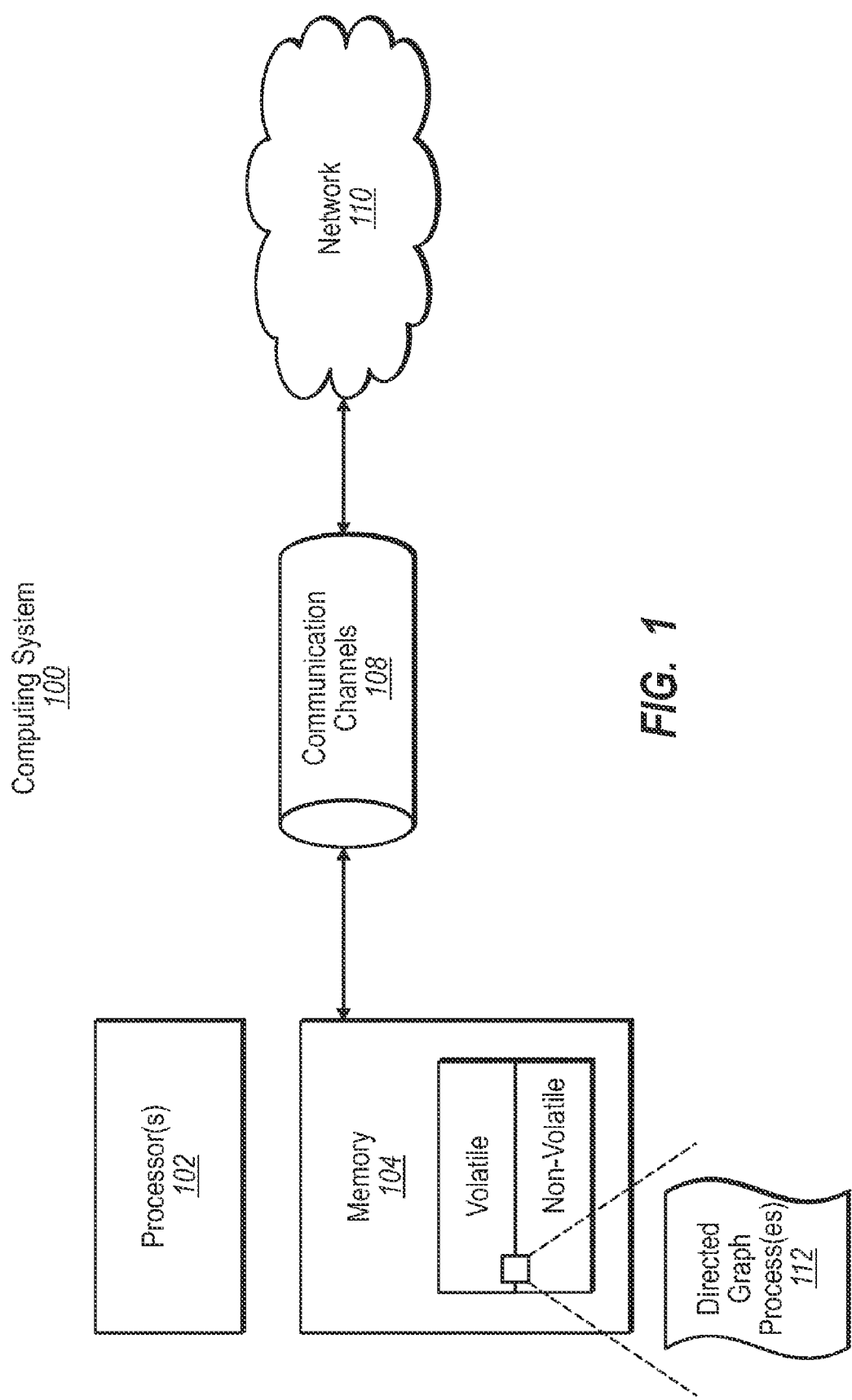
FIG. 1 illustrates a computing system in which embodiments described herein may operate.

FIG. 1 shows a schematic diagram of an example computing system 100 that may be used to implement embodiments of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments consistent with the principles described herein also include computer-readable media for carrying or having computer-executable instructions or data structures stored thereon. Such computer-readable media can be any available media that can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices. The computer-readable media may also be any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Computer programs may be represented by a directed graph which is an abstract representation (often represented in computer memory, data structures, and/or storage) that corresponds to the program control flow that occurs during execution of a program. For instance, referring to FIG. 1, one or more directed graph processes and associated data structures may be present in the memory 104 (see directed graph processes 112) or may be obtained over the communication channels 108. Note the directed graph process(es) 112 is illustrated as spanning the boundary between volatile and non-volatile memory portions of memory 104. This is intended to simply symbolically represent that the directed graph process(es) 112 (and associated data structures) may entirely be within the volatile memory, entirely be within the non-volatile memory, or may be distributed there between. Examples of directed graph processes and associated data structure will be described below with respect to FIGS. 2A and 2B.

Figure 2A:
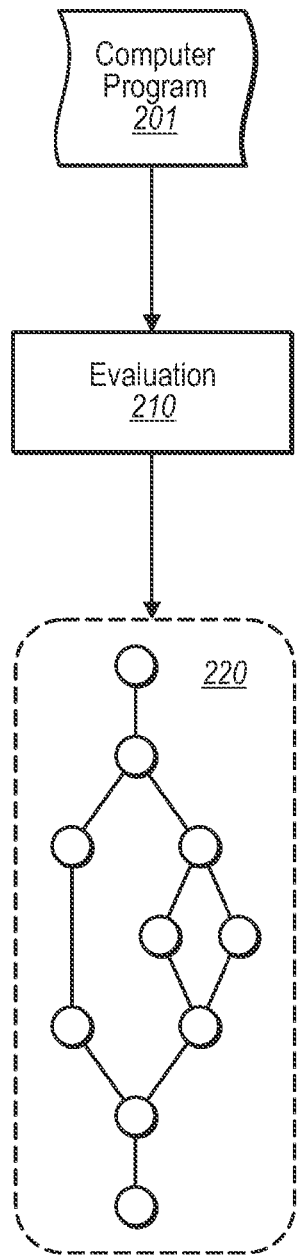
FIG. 2A illustrates the evaluation of a computer program to produce a corresponding directed graph representation.

FIG. 2A illustrates a computer program 201. The computer program 201 may be, for example, source code written by a programmer or other source code generation mechanisms. However, the computer program 201 may be object code directly executable by a computer processor or other suitable representation of instructions, statements, and/or control. The computer program 201 may also be represented by other forms of computer program code.

The computer program 201 is evaluated by an evaluation process 210 and results in a directed graph 220. The precise structure of the directed graph will of course depend heavily on the functional flow of the computer program 201, and on the semantics used in representing the directed graph. However, to illustrate an example, a relatively simply graphical depiction of a relatively simple directed graph is illustrated and described in this specification. Those of ordinary skill in the art, however, will recognize, after having reviewed this description, that the principles of the present invention may apply to any computer program and any directed graph regardless of its form or how represented. The directed graph 220 should not be considered limiting and need not be represented by a graphical depiction, as illustrated in directed graph 220, but may be represented by any suitable representation, data structure, or other suitable means.

The directed graph is a representation of the computer program where each of the nodes of the directed graph represent a statement within the computer program, a program counter, or a state of program control. In addition, each edge between the nodes of the directed graph represents the control flow of the program from one computer statement or state of program control to another statement or state of program control of the program. Each node of the directed graph, while representing a statement or a state of program control within the program, may also be thought to represent a control point within the program or a program counter within the program. As a program is executed, the computer processor proceeds from each node (i.e., control point), executing the relevant statement(s), to the next appropriate node (i.e., control point) until execution of the program (or portion of a program) completes. In one embodiment, a program counter is incremented appropriately as the execution of the computer program proceeds from node to node.

Figure 2B:
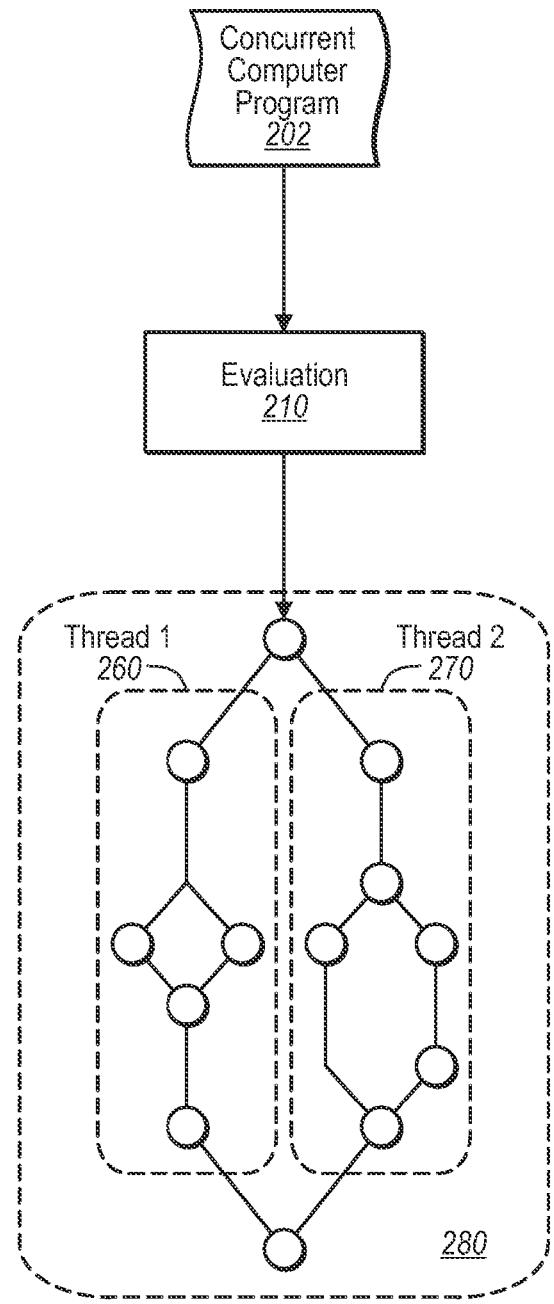
FIG. 2B illustrates the evaluation of a concurrent computer program to produce a corresponding directed graph representation.

A concurrent program is a program that may have multiple threads executing simultaneously during the execution of the program. Each thread of a concurrent program may be represented by a directed graph. FIG. 2B depicts an evaluation, similar to that in FIG. 2A, for a concurrent program. In FIG. 2B, a concurrent program 202 comprising at least Thread1 (i.e., thread 260) and Thread2 (i.e., thread 270) is evaluated (using evaluation process 210) to produce a directed graph 280. Once again, in this case, the directed graph depicts two threads, Thread1 and Thread2. Because program 202 is a concurrent program, it is possible—although not necessary—that Thread1 and Thread2 can execute simultaneously during execution of the program.

As previously mentioned, the directed graph 280 is simply one directed graph example of a concurrent program, and should not be viewed in any way as limiting the principles of the present invention. For instance, the directed graph may have more than two threads which may execute simultaneously. The principles of the present invention may even be applied to sequential programs having only one thread executing at any given time.

Although it is possible for each thread of a concurrent program to be evaluated separately, resulting in a representation of that particular thread of the concurrent program, a separate representation of each thread of a concurrent program may possibly not provide complete information concerning the possible execution of a concurrent program. For a concurrent program, it is even possible that, because of the interleaving of the processing of concurrent threads, multiple executions of the same program result in different execution orders or paths.

For a complete representation of a concurrent program, it might be beneficial to determine a representation of the program in the form of a cross product of the possibly concurrent threads of the concurrent program. This may be understood because, although one thread of a concurrent program may be executing at point N, another thread of a concurrent program might be executing at either point M or at point P. The first state, the first thread at point N and the second thread at point M, depicted herein as (N, M), is one possible state of the concurrent program. The other possible state, the first thread at N and the second thread at state P, depicted herein as (N, P), represents another possible state that may be encountered during a particular execution of the concurrent program. Because the interrelationships and interleaving between each executing thread of a concurrent program affect the overall state of a concurrent program during execution, it may be useful to determine and examine the cross product of the possible program control states of each thread of a concurrent program.

Figure 3:
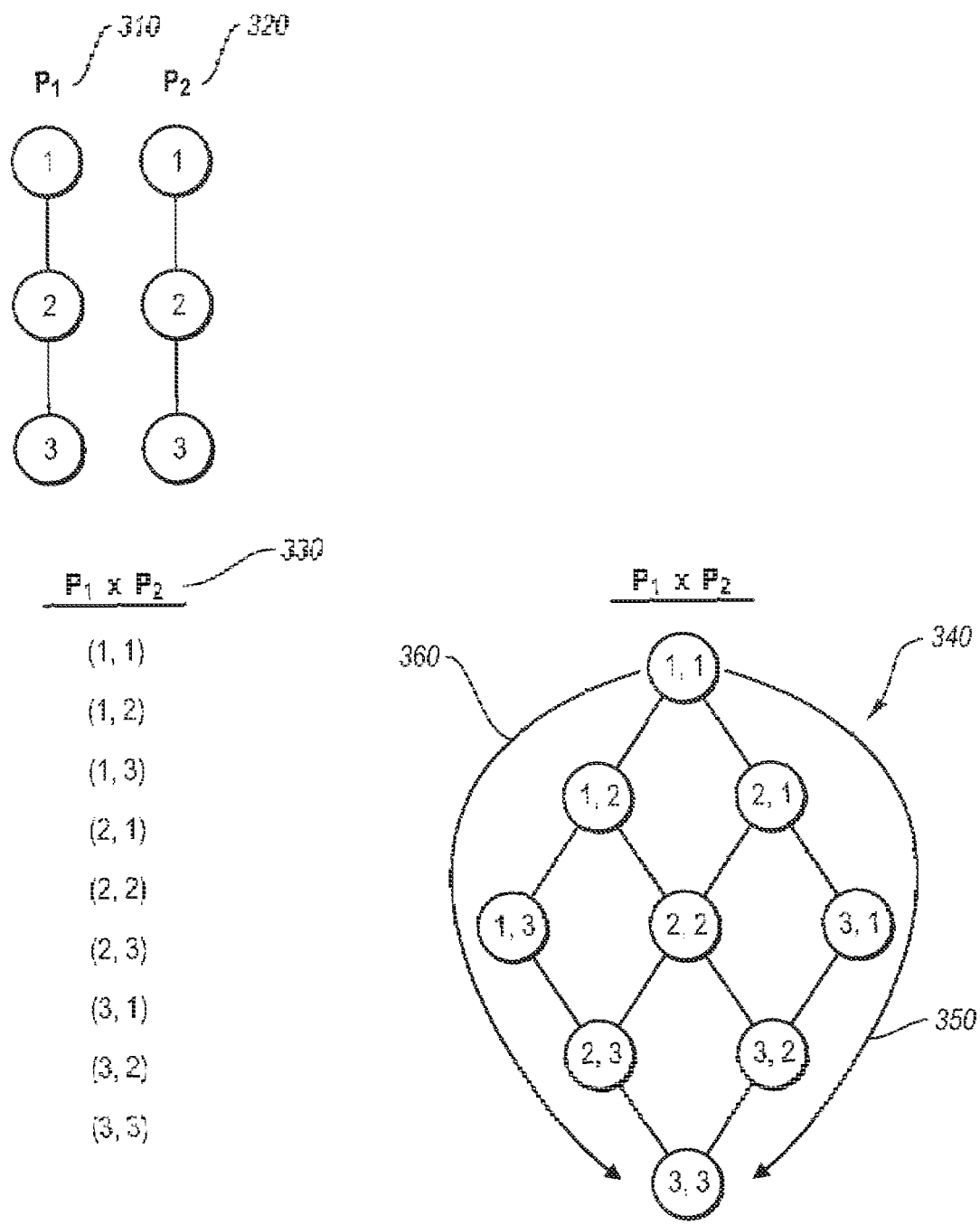
FIG. 3 illustrates two threads of a concurrent computer program, a cross product of the two threads, and a directed graph representation formulated from the cross product

FIG. 3 illustrates two purely sequential threads, P1 310 and P2 320 of a concurrent computer program. Each thread consists of three nodes, 1, 2, and 3. FIG. 3 also illustrates the cross product P1×P2 of the two sequential threads. The nodes within the cross product P1×P2 are given in table 330 and consist of the pairs {(1,1), (1,2), (1,3), (2,1), (2,2), (2,3), (3,1), (3,2), (3,3)}. The first number in the pair represents a node (or execution state) from thread P1 and the second number in the pair represents a node (or execution state) from thread P2. The directed graph which is determined by the cross product, P1×P2, is illustrated by directed graph 340.

In this cross product example, any path through the cross product P1×P2 represents a possible execution path of the program comprising the concurrent threads thread P1 and thread P2. For instance, the path 350 along the right edge of the graph depicts the execution of thread P1 followed by thread P2—that is, nodes (1,1), (2,1), and (3,1) indicate that nodes 1, 2, and 3 of P1 are executed while P2 remains at node 1. After each of the nodes in thread P1 have executed, then nodes 1, 2, and 3 of P2 are executed while thread P1 remains at node 3. Similarly, the path 360 along the left side of the directed graph 340 represents an execution of thread P2 followed by execution of thread P1. Another path not completely on the boundary of directed graph 340 but visiting the interior nodes of the graph would, in similar fashion, represent an execution of some nodes of P1 interleaved with some nodes of P2. In this way, any possible execution of P1 and P2 may be represented by a path through the directed graph 340 which represents the cross product P1×P2.

Although the cross product graph 340 depicts only two threads, this should not be considered limiting in any way. In a similar fashion and using the techniques and embodiments described herein, a concurrent program consisting of multiple threads P1, P2 . . . Pn may be represented (or depicted) as a sequential program by determining the cross product of the multiple threads comprising the concurrent program. Of course, as the number of threads increases and/or the number of possible nodes per thread increase, the cross product graph may become quite complex.

Because the possible number of states for a concurrent program might be extremely large, in one embodiment, the representation of a concurrent program is reduced to an abstraction which is more manageable during analysis. This reduction of a representation of a program may be accomplished by techniques and embodiments described herein.

Discussion of concurrent programs should not be considered limiting. Although concurrent programs may produce large representations, it is also possible for a purely sequential program to have an equally large representation. Because sequential program may have large and complicated representations, embodiments described herein may also be beneficially applied to sequential programs. Further, the term "large," as used above should also not be considered limiting. The measure of what is large and what would benefit from the abstractions and reductions of representations as described herein may be determined on a case-by-case basis and may (or may not) take into account the particular goals for a particular application or embodiment.

Figure 4A:
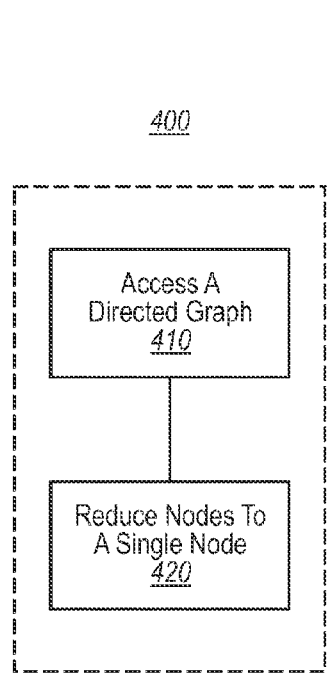
FIG. 4A illustrates a flowchart of a method by which a representation of a computer program may be abstracted by reducing multiple nodes into a single node.

FIG. 4A depicts a flowchart of a method 400 of determining an abstraction for a computer program. The method includes an act 410 of accessing a representation of a computer program which comprises a directed graph and includes an act 420 of reducing a plurality of nodes within the directed graph to a single node. It may be noted that, in general, the method illustrated in FIG. 4A may be carried out by a computer. For instance, if the method 400 were "computer-implemented" in the context of the computing system 100 of FIG. 1, computer-executable instructions from the memory 104 and/or the channels 108 may be executed by the processor 102, to thereby implement the method 400. Appropriate data structures of the process may be read from and written to either by interfacing with the 104 and/or channel 108.

The act 410 of accessing a representation of a computer program may be accomplished by calculating a representation of the program by an evaluation step, such as that depicted in FIGS. 2A and 2B, which takes computer source code, computer object code, or other representation of a computer program, as an input and produces a suitable directed graph. Alternatively or in addition, the act 410 of accessing the representation of a computer program may also be performed in various embodiments by opening a file or accessing any suitable data structure having been provided by another computer program, provided by a programmer having created a representation of a program manually, or provided by any other suitable means. The act 410 of accessing the representation of a computer program should not be considered to be limited but should include all such suitable access to a representation of a computer program.

Furthermore, the representation of the computer program may be that of a purely sequential program or may be a representation of a concurrent program. Further, if the representation of a computer program is one of a concurrent program, it may have been one of the concurrent program, itself, or a representation of a concurrent program created by determining the cross product of multiple threads of a concurrent program. Further, a representation of a concurrent program may be that of a cross product of a thread or threads of a concurrent program with an abstraction (or abstractions), as defined herein, of another thread (or threads) within the computer program.

Once a representation of a computer program has been accessed, an act 420 of reducing a plurality of nodes within the directed graph to a single node will produce an abstraction of the computer program. It should be noted that, in general, all nodes of a representation would not be reduced to a single node (which would thereby reduce a computer program to a single state). However, it may be useful to reduce all nodes of a representation of a particular thread of a concurrent program to a single node in order to produce an abstraction of a concurrent program which ignores the control flow of a particular thread. Further, embodiments described herein include reducing (abstracting) a particular thread (or threads) of a concurrent program to some number of nodes less than the total number of nodes within the thread (or threads) but greater than a single node.

As an example, it may be beneficial in particular embodiments to reduce two threads having 1000 nodes each to only ten nodes each. It may be beneficial in certain embodiments to reduce one thread of 1000 nodes to 100 nodes and reduce another thread of 1000 nodes to 10 nodes. In still other embodiments it may be beneficial to reduce one thread of 1000 nodes to 10 nodes but not reduce another thread at all. Of course, these are examples only. The actual extent of reduction should not be considered limiting and embodiments described herein include all such reductions (abstractions).

Figure 4B:
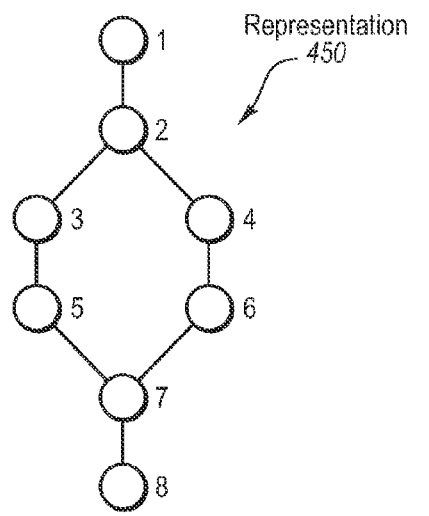
FIG. 4B illustrates an example data flow showing method of FIG. 4A applied to a specific example directed graph.
Figure 4B:
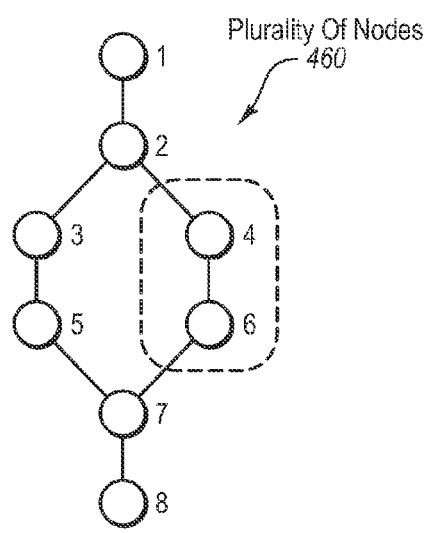
Figure 4B:
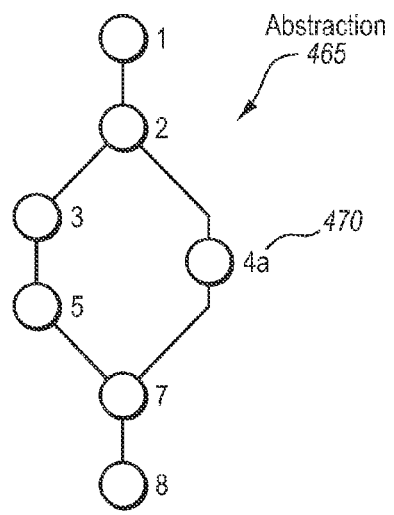

An example result of the method depicted in FIG. 4A is depicted in FIG. 4B as including nodes 1 through 8. A directed graph 450, which represents some computer program (or thread of a concurrent program) is accessed. A plurality of nodes 460—in this case, the two nodes 4 and 6—are chosen for reduction. After reducing the chosen plurality of nodes 460 (i.e., nodes 4 and 6) to a single node 465, an abstraction of the computer program is produced 470 with the two nodes represented by a single node 465 (i.e., node 4a). By having reduced a plurality of nodes in the representation to a single node, an abstraction of the computer program is produced which may be more effectively analyzed by a computer programmer, analyzer, computer scientist, computer-implemented automated analyses, or other.

Accordingly, at least some embodiments described herein enable more efficient and more innovative ways to analyze the operation of concurrent programs. The advantages include the ability to provide new and innovative abstractions of concurrent program which may be used in the design and future modification and enhancement of concurrent programs. Embodiments may also provide abstractions of computer programs which may be analyzed in new, innovative, or otherwise different and useful ways. However, the embodiments described herein should not be considered to be limited to such uses.

A representation of a computer program, comprising a directed graph and as employed in various embodiments, may be a representation of a strictly sequential computer program.

The representation of the computer program may also be a representation of a concurrent program comprising multiple threads which may possibly execute simultaneously. The computer program depicted by the representation may be a concurrent program (sometimes called a parallel program) or it may be a sequential program. When the directed graph is a representation of a concurrent program, the representation may comprise a cross product of directed graphs, each directed graph representing a thread within a concurrent program. Furthermore, the cross product of directed graphs may be a cross product of a directed graph with a directed graph which, itself, is an abstraction of a computer program or a thread within a concurrent program. Further, a cross product of directed graphs may also be the cross product of multiple threads, each of which or only some of which are, themselves, abstractions.

The particular representation of the computer program should not be considered limiting. A representation of a computer program and a representation of a directed graph may take many forms. It may take the form of a table with appropriate fields, it may take the form of a database, it may take the form of a linked list, and it may take the form of a graphical depiction. The particular form of the representation should not be considered limiting and any suitable representation of a computer program or representation of a directed graph is suitable for embodiments described herein.

Once an abstraction of a computer program has been determined, it may further be beneficial to refine an abstraction of a computer program during analysis (or other desirable use) in order to produce an abstraction suitable or in some way better suited for the analysis (or other desired use). By reducing any complete or previously abstracted representation of a computer program to some abstraction (or further abstraction) of the program, some information might be lost. It may be beneficial to have a technique by which an abstraction may be refined in order to distinguish between real problems and those which are merely artificial artifacts of the chosen abstraction. It may be desirable to restore certain information which may have been lost in one abstraction in a subsequently refined abstraction. Various embodiments of a counter-example based refinement technique will produce such a refinement.

As mentioned above, any path through a directed graph representation of a computer program represents a particular execution of the program through the program's control flow. By reducing a plurality of nodes within a directed graph to a single node, the ability to distinguish between that plurality of nodes or the particularities of the execution of a program corresponding to those nodes may be lost during analysis. The inability to distinguish between nodes after such a reduction (abstraction) may allow paths depicted through the graph to represent execution paths through the program which are infeasible—that is, paths possible through an abstraction of a program would not be possible through the actual and complete program (or be possible in a complete directed graph representation of the complete program). If a chosen path through a representation of a program produces anomalous behavior for the program (or if a particular path indicates during analysis that anomalous behavior may occur), and if it is an infeasible path. it would be desirable to preclude the infeasible path from being included in a refined abstraction of the program. Of course, if a path which is not an infeasible path (i.e., a path which is actually possible within the actual complete program) produces anomalous behavior, then that path may represent a bug within the program. Finding paths and distinguishing infeasible paths from actual counterexample paths (i.e., "bug" paths) is but one benefit of embodiments described herein.

Figure 7:
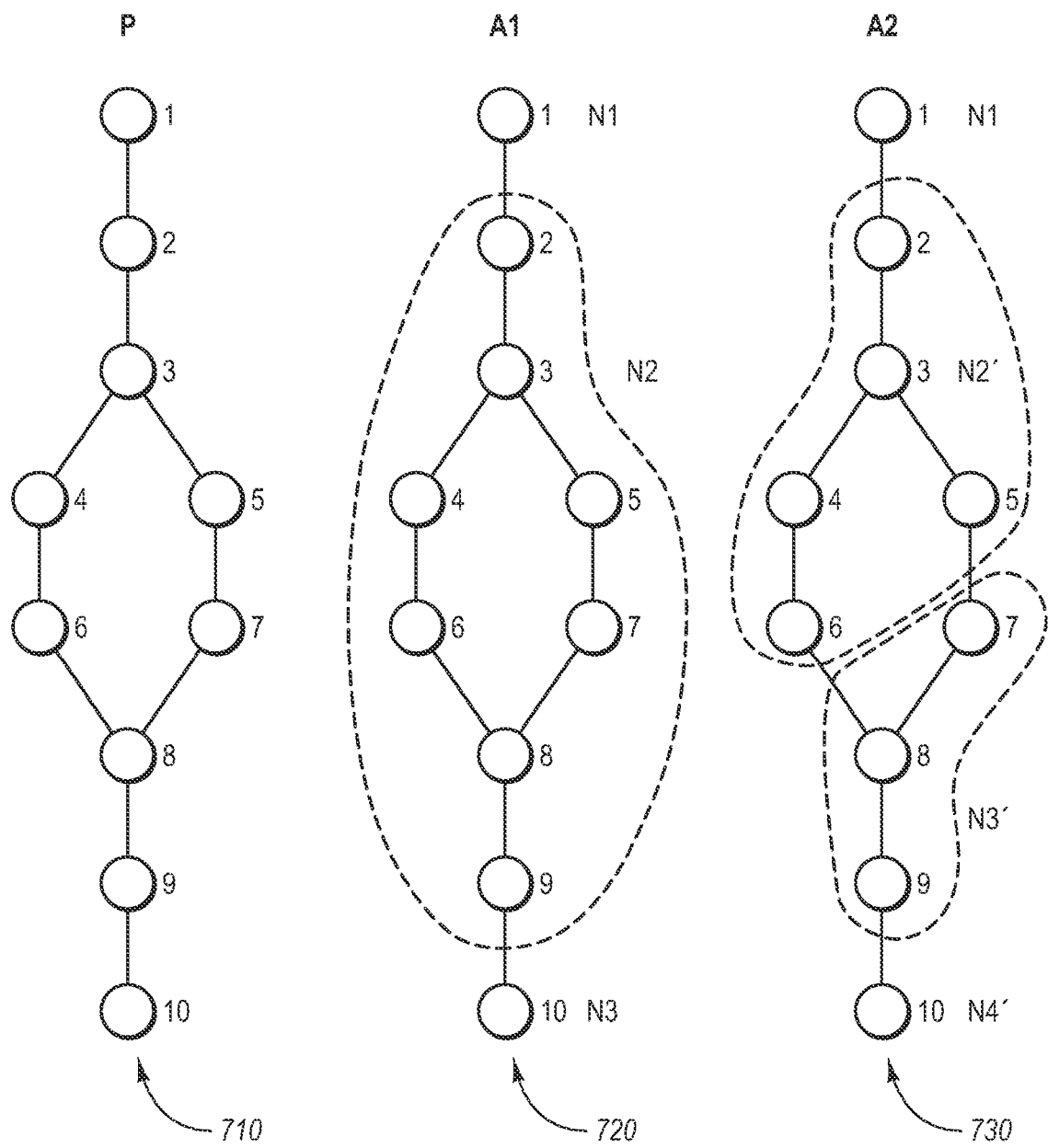
FIG. 7 illustrates a control flow representation of a computer program, an abstraction of that computer program, and a refinement of the abstraction so as to not include a particular infeasible path.

FIG. 7 illustrates an example problem which counter-example based refinement may be useful to ameliorate. Directed graph 710 depicts a complete directed graph representation (including nodes 1 through 10) of a computer program. In directed graph 720, the complete representation of the computer program has been abstracted to produce an abstraction with only three nodes, N1, N2, and N3. A path is now chosen within the abstraction, N1-N2-N3. However, the chosen path within the abstraction fails to distinguish between any of the nodes {2, 3, 4, 5, 6, 7, 8, 9} which have been reduced to node N2 and allows the execution of all the nodes which have been reduced to node N2 to occur in any order whatsoever. Because of this order information having been lost in the abstraction, the path N1-N2-N3 may comprise an infeasible path because it would allow behavior that the actual program would not allow.

Embodiments described herein, however, make it possible to find a constraint or constraints that would alleviate the problem. If, for example, the infeasible path were caused by the execution of node 8 before node 6 (which is not possible within the complete program as depicted in 710), then constructing a constraint so that node 6 must occur before node 8 would preclude the infeasible path. Such a constraint, written as a predicate [pc6<pc8], would suffice. Such a predicate informs the abstraction process that any reduction of nodes to a single node (abstraction) must preserve node 6 executing before node 8 in this example. Directed graph 730 illustrates a refined abstraction A2 of the program P with the constraint [pc6<pc8] applied. In the refined abstraction A2, by application of the constraint, node 6 has been grouped (abstracted) with those nodes reduced to node N2' and node 8 has been grouped with those nodes which have been reduced in the abstraction to node N3'. With this constraint applied, the newly refined abstraction no longer comprises the infeasible path which had been permissible and allowed within the abstraction A1 as is depicted in directed graph 720.

Applying the same constraint predicate [pc6<pc8] could also have resulted in other equally suitable refined abstractions. Various embodiments applying the principles described herein may have produced other refined abstractions and is not necessarily limited to a particular abstraction. For instance, applying the predicate [pc6<pc8] to abstraction A1 720, may have produced an abstraction wherein nodes {2, 3, 4, 5, 6, 7} were reduced to node N2" (not shown) and nodes {8, 9} were reduced to node N3" (not shown). This alternative refined abstraction of A1 is somewhat different than the refined abstraction A2 but, as above, guarantees that node 6 executes before node 8 and precludes the infeasible path from the refined abstraction. Similarly, embodiments consistent with the principles herein may produce different results but are still within the scope of the present teachings.

Figure 5A:
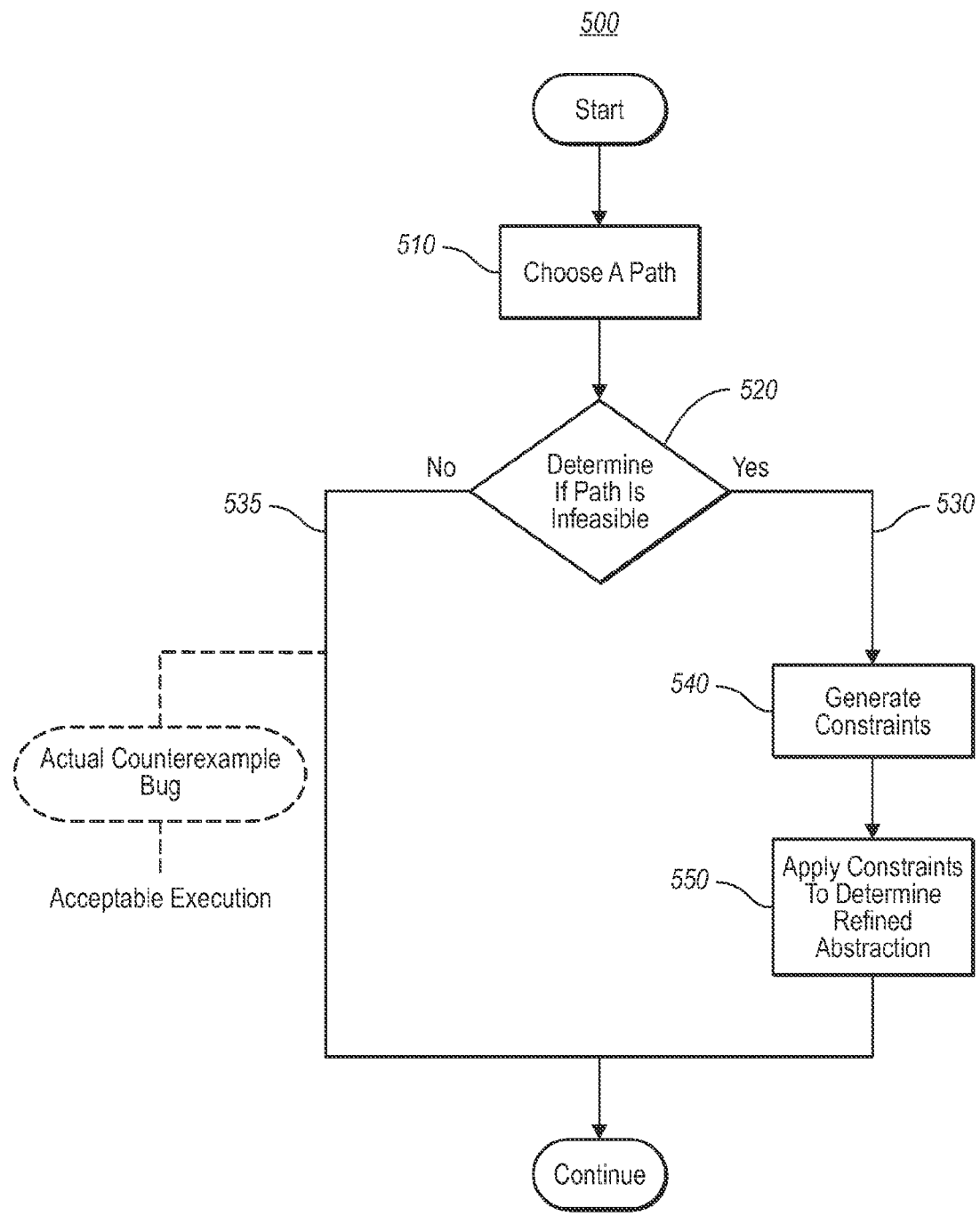
FIG. 5A illustrates a flowchart of a method of refining an abstraction of a computer program so as not to include an infeasible path.

FIG. 5A depicts a flowchart which illustrates such a counter-example based refinement method 500 for refining an abstraction of a computer program. The method 500 includes an act 510 of choosing a path within an abstraction. As discussed above, the abstraction may be that of a sequential program or that of a concurrent program. For an abstraction of a concurrent program, the abstraction may be a cross product of multiple threads of a concurrent program, or it may be a cross product of abstractions of threads of a concurrent program or a cross product of threads, some of which are abstractions but others which are complete representations.

Once a path has been chosen within an abstraction, the method 500 includes an act 520 of determining if the chosen path is an infeasible path for the actual complete program. An infeasible path, as described above, is a path which would be impossible within the actual computer program or within a complete directed graph representation of the actual complete computer program (as contrasted with an abstraction of the computer program). If the chosen path is determined to be an infeasible path, then the method follows path 530, and proceeds to an act 540 where one or more appropriate constraints are generated.

The one or more constraints generated in act 540 are generated such that, after being applied to the abstraction, a refined abstraction will no longer comprise the infeasible path. The constraints generated may be time-based constraints (which describe precedence relationship between execution of program nodes within different threads). The generated constraints may also be order-based constraints (which describe precedence relationship between execution of program nodes within the same thread, e.g., [pc6<pc8], as discussed previously). The constraints may comprise a predicate which, as described above, when applied to the abstraction of the computer program, produce a refined abstraction. However, the constraints generated should not be considered limited to those particularly described above, but be considered to include any suitable constraints generated which, when applied to an abstraction to produce a refined abstraction, serve to refine the abstraction of the computer program so that it no longer comprises the infeasible path.

If and when constraints are generated in act 540, then a refined abstraction is generated in act 550 by applying the constraints to the abstraction of the computer program to produce a refined abstraction of the computer program. The refined abstraction produced by act 550 then no longer comprises the infeasible path.

If in act 520 the path chosen within the abstraction is determined not to comprise an infeasible path, then path 535 is followed and additional constraints are not generated. A path which is not determined to be an infeasible path may represent an actual counter-example (i.e., a bug) within the program. The path may also represent a path which may simply be uninteresting to the particular analysis or process which motivated the abstraction. A path which is not an infeasible path may also represent an acceptable execution path for the program having been abstracted.

Figure 5B:
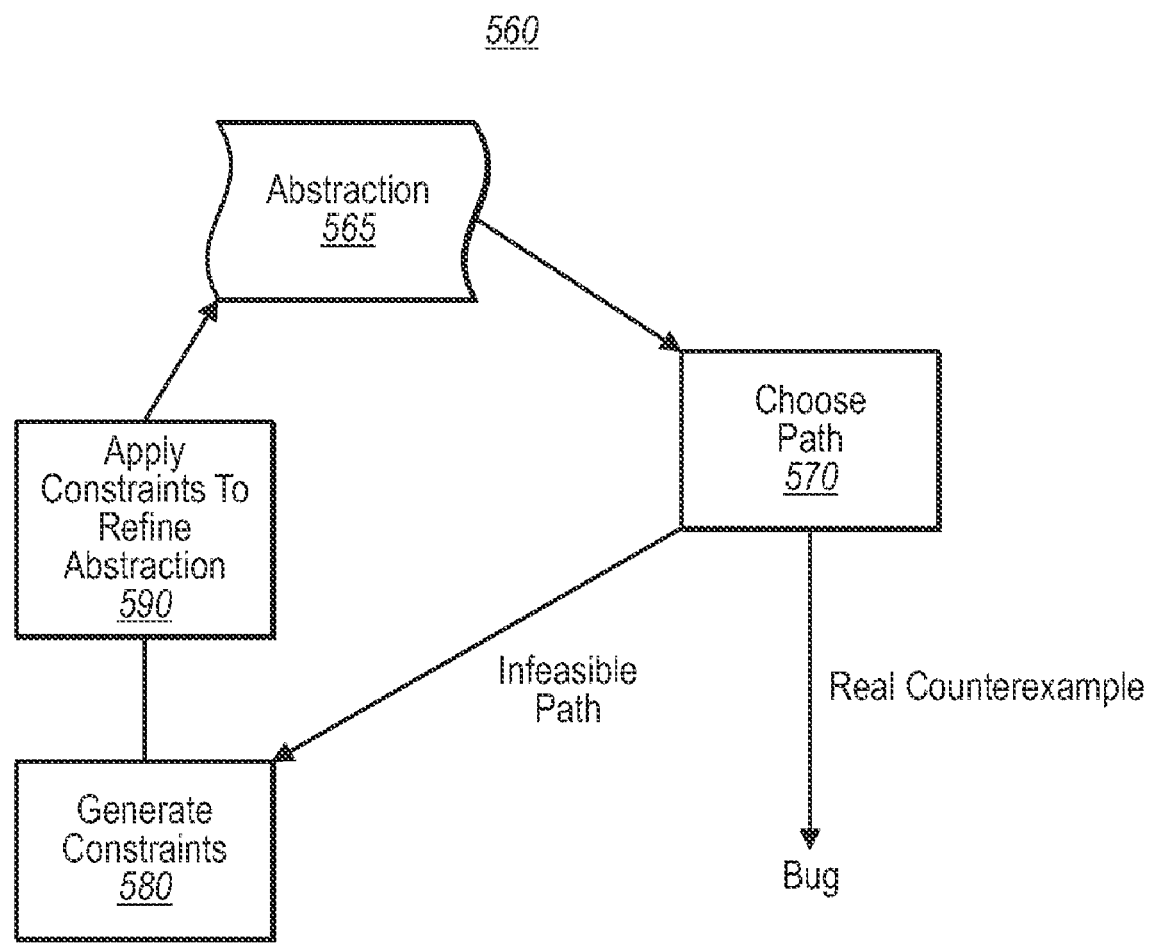
FIG. 5B illustrates an example data flow associated with an iterative example of a method of refining an abstraction of a computer program.

It may be appreciated that the method 500 of FIG. 5A may be applied a single time to an abstraction or it may be applied iteratively or recursively to multiple paths within a program abstraction or successively refined abstractions in order to refine an abstraction to whatever degree might be desired or might be useful for any particular application. Various embodiments support such iterative or recursive application of the principles described herein. FIG. 5B illustrates a method 560 similar to that of FIG. 5A wherein the refinement of the abstraction of a computer program is performed iteratively. In FIG. 5B, a path is chosen 570 from an abstraction 565 of a computer program. The abstraction may have been determined according to principles of embodiments described herein. Further, the abstraction may be that of a concurrent program or a sequential program or may be a cross product of threads or abstractions of threads. As described above, if the path chosen from the abstraction is a real counter-example, then it is considered to be a bug within the program (or possibly a path not considered interesting for the particular application). If the path is an infeasible path (i.e., a spurious counter-example which may not be possible within the actual complete program), then constraints are generated 580 so that the infeasible path may be excluded from the abstraction. The constraints generated are then applied 590 to the abstraction to produce a refined abstraction which does not comprise the infeasible path. In this way the iterative process may begin again with a refined abstraction and repeated as necessary or as desired to produce an abstraction sufficiently refined for a particular application. Embodiments applying these principles may iteratively and successively produce more and more refined abstractions which are iteratively honed toward the analysis or application particularly desired.

Figure 6:
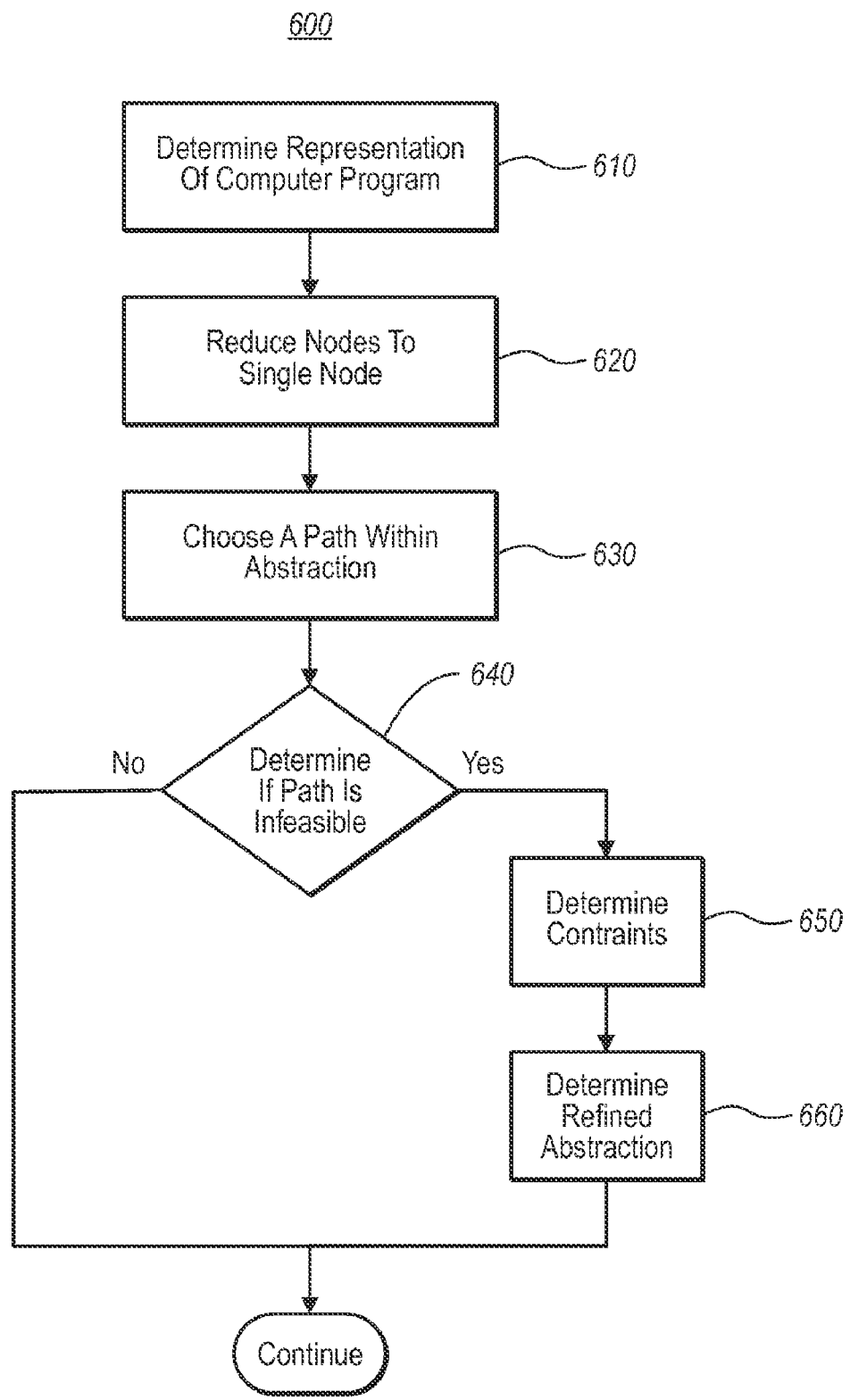
FIG. 6 illustrates a flowchart of a method of determining a representation, determining an abstraction of a computer program, and refining the abstraction not to include an infeasible path.

FIG. 6 is a flowchart which illustrates a method 600 of determining an abstraction of a computer program. The method depicted in FIG. 6 begins with an act 610 of determining a representation of a computer program wherein the representation comprises a directed graph. As discussed above, the representation determined may be a representation of a purely sequential program. The representation may also be that of a concurrent program. Additionally, the representation may be one determined by taking the cross product of two or more threads of a concurrent program and each thread within the cross product may, itself, be (or not be) an abstraction.

Once a representation of a computer program has been determined, the method includes an act 620 of reducing a plurality of nodes within the directed graph to a single node. As described above, the plurality of nodes reduced to a single node may be a large number (leading to a coarse grained abstraction) or a small number (leading to a finer grained abstraction). The plurality of nodes may be nodes within a cross product which represents the concurrent execution of threads of a concurrent program, may be completely within a single thread of a concurrent program, or may be nodes within a sequential program. Reducing the plurality of nodes to a single nodes results in an abstraction of the representation of the computer program with which the process began.

Once given an abstraction of a computer program, as described above, the method then proceeds to an act 630 of choosing a path within that abstraction. It is then determined in act 640 if the chosen path is an infeasible path. Upon determining that the chosen path is an infeasible path, one or more constraints are generated in act 650 to refine the abstraction such that the refined abstraction does not comprise the infeasible path. The constraints generated may be time-based constraints, they may be order-based constraints, and they may be represented by predicates. The constraints should not be considered limited but include any constraints which, when applied to the abstraction, would serve to exclude the infeasible path from the abstraction.

Once such constraints have been determined, a refined abstraction may be determined in act 650 by applying the determined constraints to the abstraction to produce a refined abstraction which does not comprise the infeasible path. After a refined abstraction has been produced, the process may stop with the resulting abstraction used for any appropriate purpose or the process may continue, as described above, by further iteratively refining the abstraction.

If the path chosen 630 does not comprise an infeasible path, then the process may stop with the resulting abstraction used for any appropriate purpose or the process may continue, again as described above, by further iteratively refining the abstraction, this time by choosing a different path from the abstraction.

It should be noted that the above processes are useful not simply for determining refined abstractions for computer programs. During the process of choosing paths within an abstraction and determining if the chosen paths are infeasible path, real counter-example paths may be found. If a real counter-example path is found during the process, then a real bug may have been found within the computer program under analysis. This is one aspect of the analysis of computer programs and the determination and refinement of abstractions which produces useful results for software engineers, computer programmers, computer scientists, and other interested parties.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method of determining an abstraction for a computer program, the method comprising:
    accessing within a computer a representation of the computer program, the representation comprising a directed graph;
    reducing a plurality of nodes within the directed graph to a single node, the plurality of nodes including only less than all nodes within the directed graph, thereby generating an abstraction of the directed graph;
    choosing a path in the abstraction which includes the single node;
    determining if the path is an infeasible path that represents a process that would not be possible for execution of the computer program;
    upon determining the path is infeasible, generating one or more constraints to refine the abstraction such that a refined abstraction can be generated that applies the constraints to effectively eliminate the infeasible path from the refined abstraction; and
    generating the refined abstraction by applying the one or more constraints to the abstraction.

2. The method of claim 1 wherein the directed graph represents a control flow graph of the computer program.

3. The method of claim 1 wherein the nodes of the directed graph represent control points within the computer program.

4. The method of claim 1 wherein the computer program is a concurrent program that executes a plurality of threads concurrently.

5. The method of claim 4, wherein the abstraction comprises an abstraction of an entire thread of the plurality of threads to the single node.

6. The method of claim 1 wherein the directed graph is a cross product of two or more directed graphs.

7. The method of claim 1 wherein the abstraction comprises a cross product of two or more directed graphs, at least one of the two or more directed graphs being an abstraction.

8. The method of claim 1 wherein the nodes of the directed graph represent program counter values for a thread of the computer program.

9. The method of claim 1 wherein at least one constraint comprises an order-based constraint.

10. The method of claim 1 wherein at least one constraint comprises a time-based constraint.

11. The method of claim 1 wherein at least one constraint of the one or more constraints comprises a predicate.

12. One or more tangible computer-readable storage device having encoded thereon computer executable instructions which, when executed, implement a method of determining an abstraction for a computer program, the method comprising:
    determining a representation of the computer program, the representation comprising a directed graph;
    reducing one or more nodes within the directed graph to a single node, thereby generating an abstraction of the directed graph;
    choosing a path in the abstraction which includes the single node;
    determining if the path is an infeasible path that represents a process that would not be possible for execution of the computer program;
    upon determining the path is infeasible, generating one or more constraints to refine the abstraction such that a refined abstraction can be generated that applies the constraints to effectively eliminate the infeasible path from the refined abstraction; and
    generating the refined abstraction by applying the one or more constraints to the abstraction.

13. The one or more storage device of claim 12 wherein the computer program is a concurrent program that executes multiple threads concurrently.

14. The one or more storage device of claim 12 wherein the directed graph is a cross product of at least two threads of a concurrent program.

15. The one or more storage device of claim 12 wherein at least one constraint is an order-based constraint.

16. The storage device of claim 12, wherein the refined abstraction expands the single node into at least two different nodes.

17. A computing system comprising:
    at least one processor; and
    system memory having stored computer-executable instructions which, when executed by the at least one processor, implement a method that includes:
        accessing a computer a representation of a computer program, the representation comprising a directed graph;
        reducing a plurality of nodes within the directed graph to a single node, the plurality of nodes including only less than all nodes within the directed graph, thereby generating an abstraction of the directed graph;
        choosing a path in the abstraction which includes the single node;
        determining if the path is an infeasible path that represents a process that would not be possible for execution of the computer program;
        upon determining the path is infeasible, generating one or more constraints to refine the abstraction such that a refined abstraction can be generated that applies the constraints to effectively eliminate the infeasible path from the refined abstraction; and
        generating the refined abstraction by applying the one or more constraints to the abstraction.

* * * * *